(12) United States Patent
Harrington (10) Patent No.: US 8,175,332 B2
(45) Date of Patent: May 8, 2012

(54) UPPER TROPOSPHERE AND LOWER STRATOSPHERE WIND DIRECTION, SPEED, AND TURBIDITY MONITORING USING DIGITAL IMAGING AND MOTION TRACKING

(75) Inventor: Nathan John Harrington, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 12/125,553

(22) Filed: May 22, 2008

(65) Prior Publication Data

US 2009/0290761 A1  Nov. 26, 2009

(51) Int. Cl.
*G06K 9/00* (2006.01)
*G06K 9/40* (2006.01)

(52) U.S. Cl. ........ 382/103; 382/106; 382/107; 382/109; 382/266

(58) Field of Classification Search .............. 382/103, 382/106, 109
See application file for complete search history.

(56) References Cited

U.S. PATENT DOCUMENTS

| | | |
|---|---|---|
| 3,984,685 A | 10/1976 | Fletcher et al. |
| 4,735,503 A | 4/1988 | Werner et al. |
| 5,051,750 A | 9/1991 | Hollister |
| 5,088,815 A | 2/1992 | Garnier et al. |
| 5,285,256 A | 2/1994 | Nelson et al. |
| 5,999,639 A * | 12/1999 | Rogers et al. ............... 382/132 |
| 2002/0038456 A1* | 3/2002 | Hansen et al. ................ 725/46 |
| 2008/0205710 A1* | 8/2008 | Benten ......................... 382/107 |
| 2008/0262718 A1* | 10/2008 | Farwell ........................ 701/207 |

OTHER PUBLICATIONS

Homburg et al., "Camera guided based scanning lidar for contrail invegtigations: Extrapolation of lidar measurements to CCD camera images and comparison with satellite data." Oct. 31, 1997, SPIE, Proceedings vol. 3127, pp. 25-31.*
Duda, David P, "A Case Study of the Development of Contrail Clusters over the Great Lakes", Dec. 5, 2003, Journal of the Atmospheric Sciences, vol. 61, pp. 1132-1146.*
Collins et al., "An Active Camera System for Acquiring Multi-View Video", Dec. 10, 2002, IEEE, International Conference on Image Processing Proceedings, pp. 517-520.*

* cited by examiner

*Primary Examiner* — Jason M Repko
*Assistant Examiner* — David Perlman
(74) *Attorney, Agent, or Firm* — Yee & Associates, P.C.; John R. Pivnichny (57) ABSTRACT

A computer implemented method, apparatus, and computer program product for monitoring wind direction, speed, and turbidity. The visible sky is monitored by a set of cameras for contrails produced by a high-altitude aircraft. In response to identifying a contrail, the contrail is tracked across the field of view of the camera. Contrail data generated when the contrail is identified and during the tracking of the contrail is stored. The contrail data describes characteristics of the contrail including the spread of the contrail and the movement of the contrail across the field of view of the camera. Coordinates of the high-altitude aircraft are determined and compared with the contrail data to identify wind conditions.

11 Claims, 6 Drawing Sheets

UPPER TROPOSPHERE AND LOWER STRATOSPHERE WIND DIRECTION, SPEED, AND TURBIDITY MONITORING USING DIGITAL IMAGING AND MOTION TRACKING

BACKGROUND OF THE INVENTION

1. Field of the Invention

The present invention relates generally to an improved data processing system and more specifically to measurements of wind conditions. More particularly, the present invention is directed to a computer implemented method, apparatus, and computer usable program code for monitoring wind direction, speed, and turbidity using digital imaging and/or motion tracking.

2. Description of the Related Art

Several methods exist to determine wind conditions. Existing solutions include wind measurement systems using lasers, winds aloft estimation through radar observation of aircraft, and weather balloons. These methods generally require complex and expensive equipment, such as electromagnetic emission and detection apparatus, and are typically only able to capture information from a small geographical area. Additionally, it is often necessary to mount the equipment to an aircraft in order to obtain accurate wind condition information.

BRIEF SUMMARY OF THE INVENTION

A computer implemented method, apparatus, and computer program product for monitoring wind direction, speed, and turbidity. The visible sky is monitored by a set of cameras for contrails produced by a high-altitude aircraft. In response to identifying a contrail, the contrail is tracked across the field of view of the camera. Contrail data generated when the contrail is identified and during the tracking of the contrail is stored. The contrail data describes characteristics of the contrail including the spread of the contrail and the movement of the contrail across the field of view of the camera. Coordinates of the high-altitude aircraft are determined and compared with the contrail data to identify wind conditions.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to, wireless, wireline, optical fiber cable, RF, etc.

Computer program code for carrying out operations of the present invention may be written in any combination of one or more programming languages, including an object oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
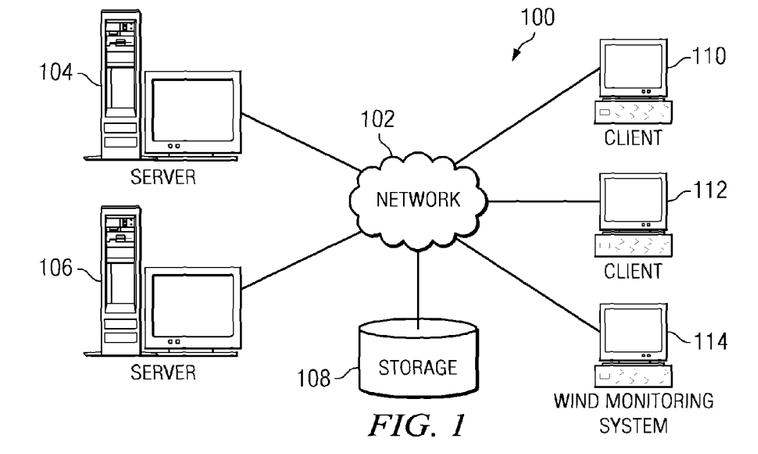
FIG. 1 is a pictorial representation of a network of data processing systems in which illustrative embodiments may be implemented.
Figure 2:
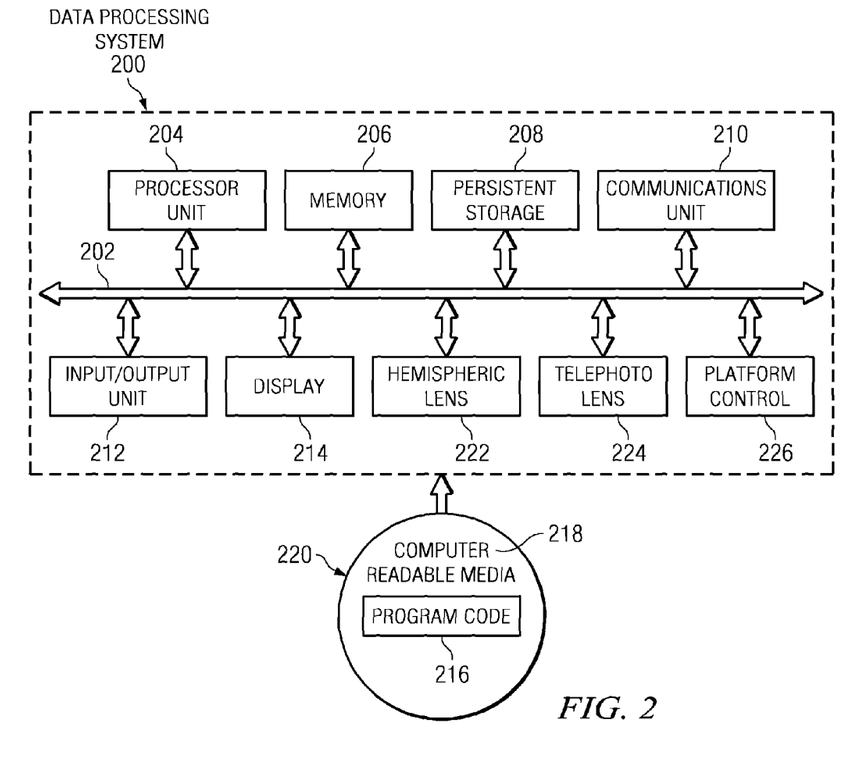
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables. In the depicted example, server 104 and server 106 connect to network 102 along with storage unit 108.

In addition, clients 110 and 112 connect to network 102. Clients 110 and 112 may be, for example, personal computers or network computers. In the depicted example, server 104 provides data, such as boot files, operating system images, and applications to clients 110 and 112. Clients 110 and 112 are clients to server 104 in this example. Wind monitoring system 114 also connects to network 102. Wind monitoring system 114 may include a computing device and a set of cameras for identifying wind direction, speed, and turbidity using digital imaging and motion tracking. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, display 214, hemispheric lens 222, telephoto lens 224, and platform control 226.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user. Hemispheric lens 222 captures whole-sky images. Telephoto lens 224 is adjustable in order to magnify images in the visible sky. Platform control 226 allows the settings of telephoto lens 224 to be adjusted in order to track objects within an image of the visible sky.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The illustrative embodiments recognize a need for a low cost system to monitor upper troposphere and lower stratosphere wind direction, turbidity, and speed. Although current systems can probe wind conditions to determine wind direction, turbidity, and speed, the current systems require expensive equipment while only capturing information for a small geographical area.

Therefore, the illustrative embodiments provide a computer implemented method, apparatus, and computer program product for monitoring wind direction, speed, and turbidity. The visible sky is monitored with a camera for contrails produced by a high-altitude aircraft. When a contrail is identified, the contrail is tracked across the field of view of the camera. Contrail data generated when the contrail is identified and during the tracking of the contrail is stored. The contrail data describes characteristics of the contrail including the spread of the contrail and the movement of the contrail across the field of view of the camera. Coordinates of the high-altitude aircraft are determined and compared with the contrail data to determine wind conditions.

Figure 3:
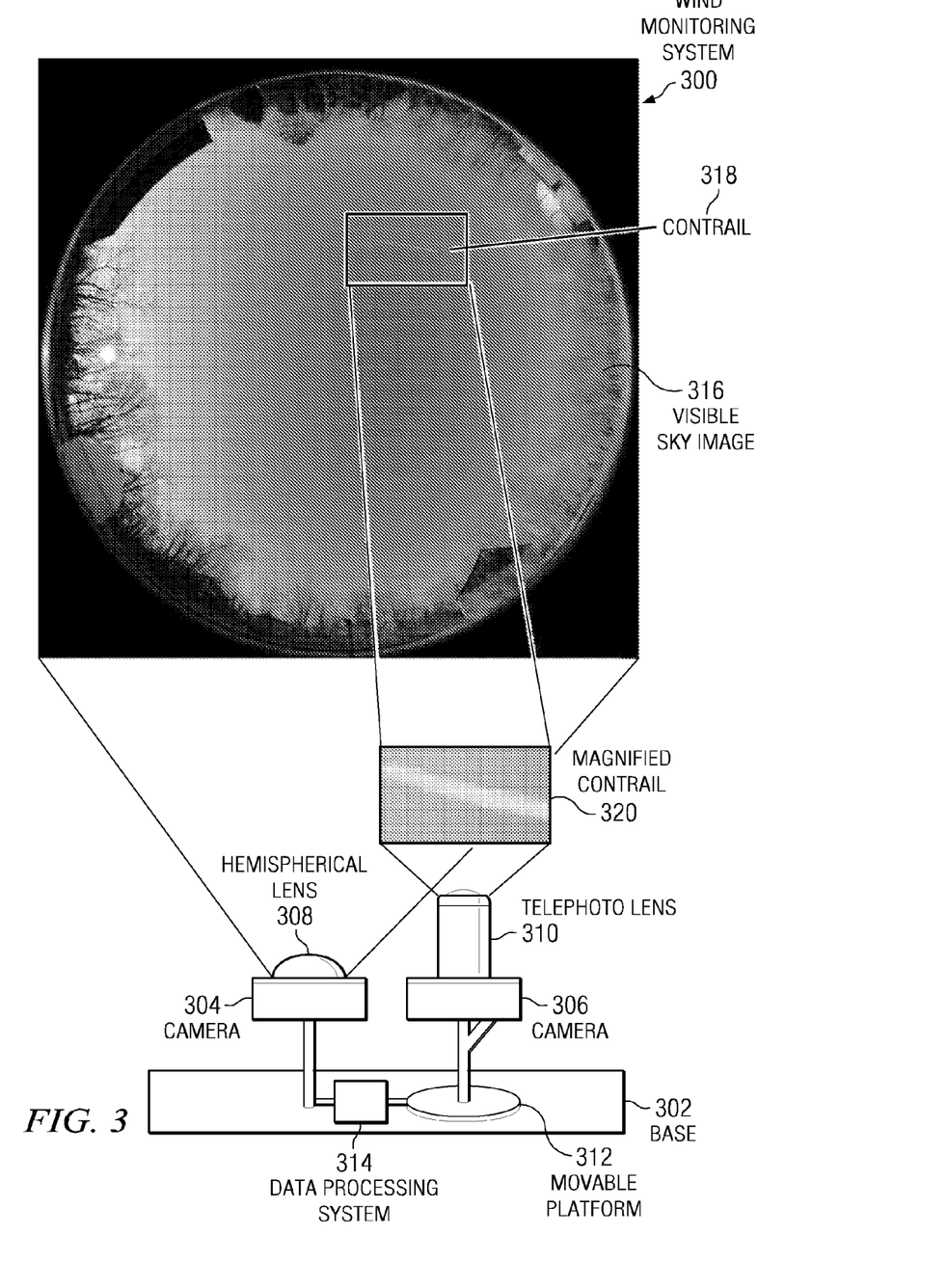
FIG. 3 is a block diagram of a wind monitoring system in which illustrative embodiments may be implemented.

FIG. 3 is a block diagram of a wind monitoring system in which illustrative embodiments may be implemented. Wind monitoring system 300 may be implemented using any type of computing device, including, without limitation, a personal computer, laptop, personal digital assistant, a server, or any other computing device depicted in FIGS. 1 and 2.

Base 302 houses camera 304 and camera 306. A camera may be any type of known or available camera for capturing one or more images, including, but not limited to, a video camera for taking moving video images, a digital camera capable of taking still pictures and/or a continuous video stream, a stereo camera, a web camera, and/or any other imaging device capable of capturing a view of whatever appears within the camera's range for remote monitoring, viewing, or recording of a distant or obscured person, object, or area. Various lenses, filters, and other optical devices, such as zoom lenses, wide angle lenses, mirrors, prisms and the like may also be used with the camera to assist in capturing the desired view. The camera may be fixed in a particular orientation and configuration, or it may, along with any optical devices, be programmable in orientation, light sensitivity level, focus or other parameters. Programming data may be provided via a computing device, such as server 104 in FIG. 1.

A camera may also be a stationary camera and/or non-stationary cameras. A non-stationary camera is a camera that is capable of moving and/or rotating along one or more directions, such as up, down, left, right, and/or rotate about an axis of rotation. The camera may also be capable of moving to follow or track a person, animal, or object in motion. In other words, the camera may be capable of moving about an axis of rotation in order to keep a customer, animal, or object within a viewing range of the camera lens.

A set of cameras is defined as one or more cameras. In one embodiment, if the set of cameras is comprised of two or more cameras, the cameras may be connected to a wired or wireless network. In another embodiment, images and sets of images captured by the set of cameras may be transferred to a data processing system using removable data storage, such as, without limitation, memory stick, flash memory, jump drive, readable disk, and the like.

Camera 304 uses hemispherical lens 308, which is a lens that captures whole-sky images. A whole-sky image is a 360° image of the visible sky directly above the camera. Camera 306 uses telephoto lens 310, which is an adjustable lens capable of magnifying images. Camera 306 is mounted on movable platform 312. Movable platform 312 enables movement of camera 306 to be controlled for following images in the visible sky. Data processing system 314 interacts with camera 304, camera 306, hemispherical lens 308, telephoto lens 310, and movable platform 312, to monitor and track contrails formed by high-altitude aircraft in the visible sky. Hemispherical lens 308 has a field of view of the visible sky that enables camera 304 to capture visible sky image 316 when contrail 318 appears within the field of view of hemispherical lens 308. Data processing system 314 then processes information about contrail 318 and sends instructions to movable platform 312, camera 306, and telephoto lens 310, to adjust settings in order to capture magnified contrail 320 and contrail 318 across the field of view.

The data processing system consists of a "standard" personal computer, which contains the capabilities for controlling electronic motors that rotate the platform and change the zoom angle of the telephoto lens. Typically, this is done through serial port connections between the motors controlling circuitry and the personal computing device. This sort of external device control by a personal computer is very common in prior art.

Data processing system 314 accesses information about recent flight paths within the field of view. In one embodiment, information about recent flight paths are obtained through internet databases containing current flight path information including precise coordinates of each aircraft on the flight path obtained through the on-board navigational system of the aircraft.

Figure 4:
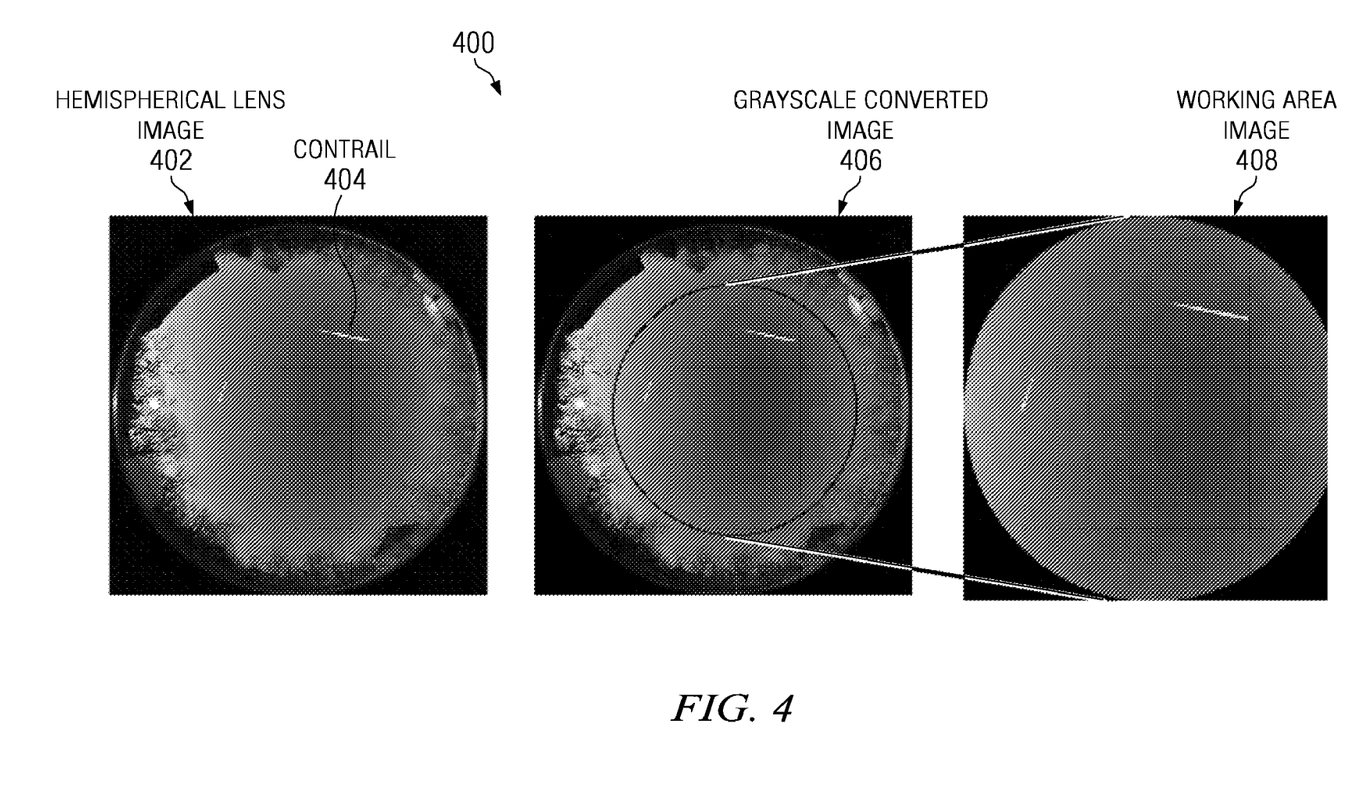
FIG. 4 is a block diagram of hemispherical lens acquisition of contrails in which illustrative embodiments may be implemented.

FIG. 4 is a block diagram of hemispherical lens acquisition of contrails in which illustrative embodiments may be implemented. Hemispherical lens image 402 is captured by a camera with a hemispherical lens, such as camera 304 and hemispherical lens 308 in FIG. 3. Contrail 404 is detected in hemispherical lens image 402, and a data processing system, such as data processing system 314 in FIG. 3, converts hemispherical lens image 402 into grayscale converted image 406. The data processing system then applies a Difference of Gaussians function to grayscale converted image 406 in order to extract objects associated with the horizon, producing working area image 408. Working area image 408 can then be used to determine information about contrail 404, such as altitude and position of contrail 404, which can then be used to track contrail 404 and generate information about the wind conditions affecting contrail 404. When a Difference of Gaussians function is applied to produce working area image 408, the result is a pixilated image where each black pixel represents the contrail and each white pixel represents the background of the image. Each black pixel in each image in a set of images can be computed to generate a computational average position of the pixel throughout each image. Each image represents a different moment in time. Thus, the average position of the pixel over a period of time captured by the set of images can be used to determine the wind speed and turbidity.

Monitoring the median coordinate position of the black pixels will give an indication of the turbidity of the wind at altitude. As the contrail is spread by a highly turbid wind flow, the median value of black pixels will move towards the center of the image. The rate of change of the median value is indicative of the turbidity of wind at altitude.

Figure 5:
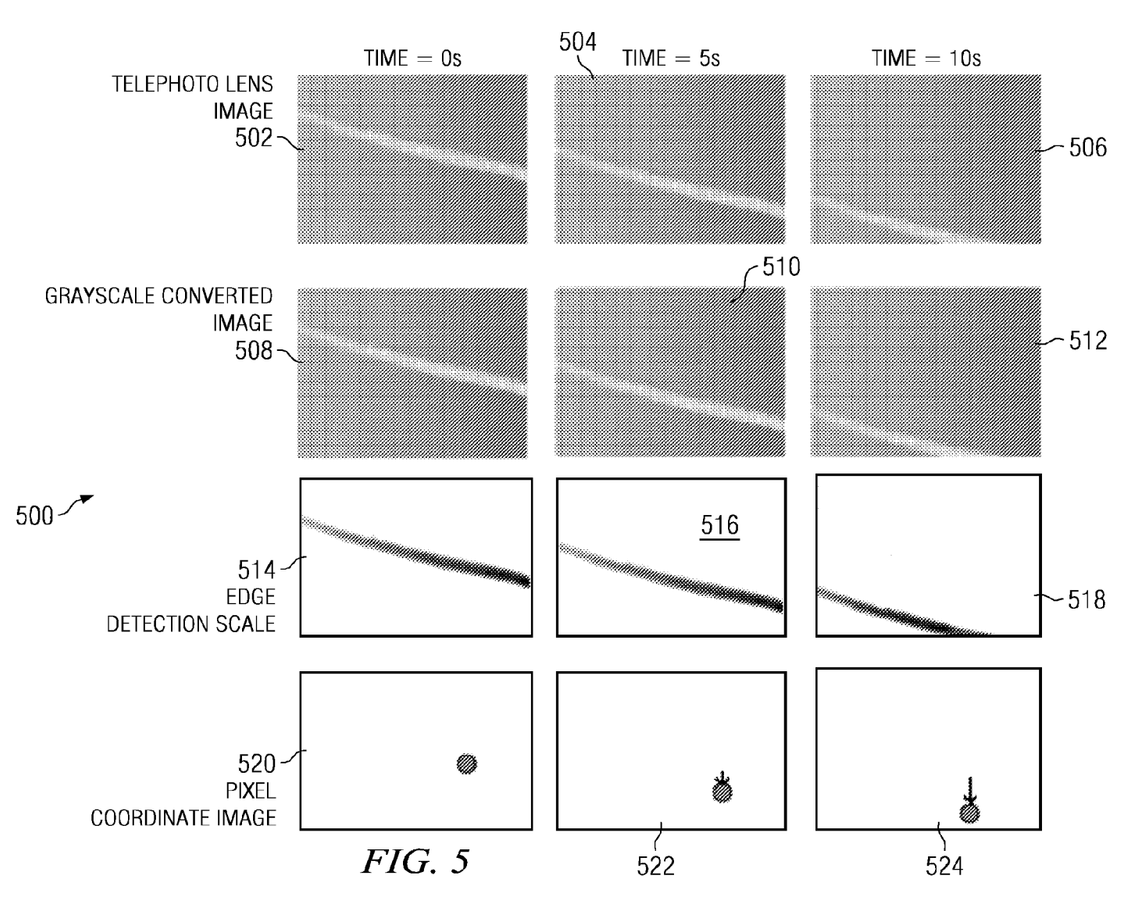
FIG. 5 is a block diagram of images captured by a telephoto lens tracking a contrail in which illustrative embodiments may be implemented.

FIG. 5 is a block diagram of images captured by a telephoto lens tracking a contrail in which illustrative embodiments may be implemented. Telephoto lens image 502 is captured by a camera and telephoto lens, such as camera 306 and telephoto lens 310 in FIG. 3, when a contrail is identified. Telephoto lens image 502 is captured at zero seconds. Telephoto lens image 504 is captured at five seconds, and telephoto lens image 506 is captured at ten seconds. A grayscale filter is applied to each image, producing grayscale converted images 508, 510, and 512. A Difference of Gaussians filter is applied to each grayscale converted image to product edge detection images 514, 516, and 518. Each edge detection image is a pixilated image that allows the edges of the contrail to be distinguished from the background of the image. Each pixel in a pixilated image can be computed to determine and average the coordinate of the pixel in the image. A pixel computation is applied to each edge detection image to produce pixel coordinate images 520, 522, and 524. The time progression of the images along with the pixel coordinates computed for each image produces data describing the movement of the contrail over time, which provides information about wind speed and turbidity. For example, the further the progression of a black pixel across the time progression images, the faster the wind speed is that moves the contrail through the field of view of the cameras. Likewise, the direction that the pixel travels can indicate the spread of the contrail, which in turn provides information about the wind turbidity.

Figure 6:
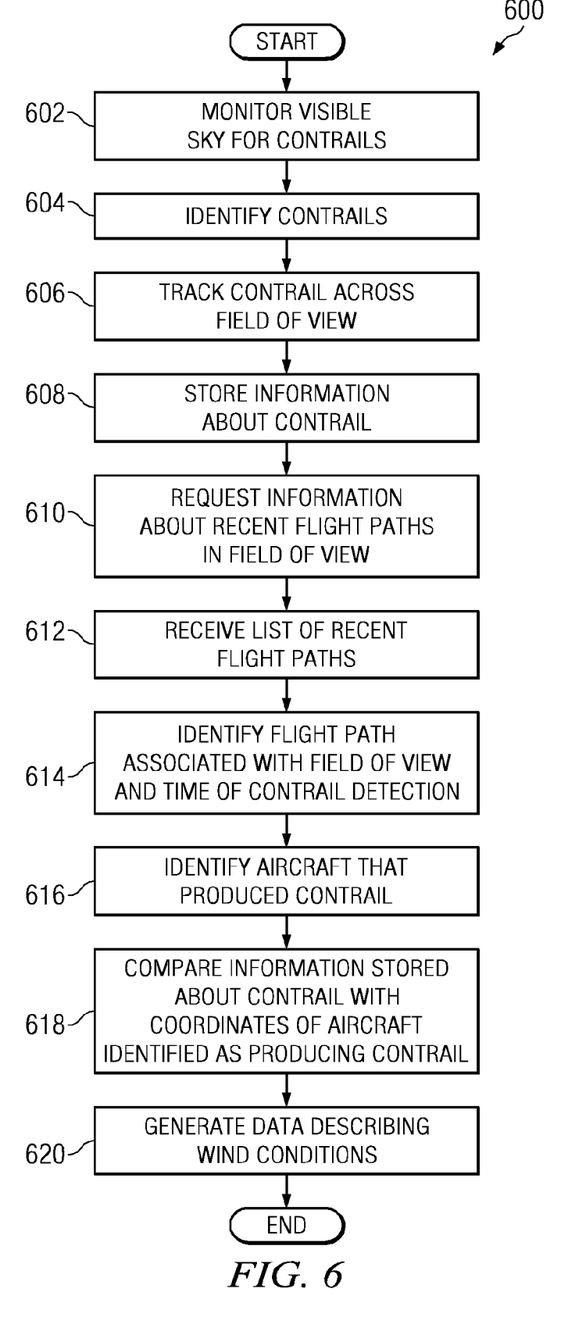
FIG. 6 is a flowchart illustrating a process for monitoring the visible sky to determine wind conditions.

FIG. 6 is a flowchart illustrating a process for monitoring the visible sky to determine wind conditions. The process in FIG. 6 is implemented by a wind monitoring system, such as wind monitoring system 300 in FIG. 3.

The process begins by monitoring the visible sky for contrails (step 602). The process identifies a contrail (step 604) and tracks the contrail across the field of view (step 606). The process stores information about the contrail (step 608). Next, the process requests information about recent flight paths in the field of view (step 610). In one embodiment, the request for information may be made to an internet database that communicates with navigational systems on aircraft and logs the precise coordinates of the aircraft through the flight path. The process receives a list of recent flight paths (step 612) that passed through the field of view. The process identifies a flight path that associated with the field of view and the time the contrail was detected (step 614), and then identifies the aircraft that was on that flight path at the time the contrail was detected (step 616). The process compares information stored about the contrail with the precise coordinates of the aircraft identified as producing the contrail (step 618) and generates data describing wind conditions (step 620) based on the contrail information, with the process terminating thereafter.

Figure 7:
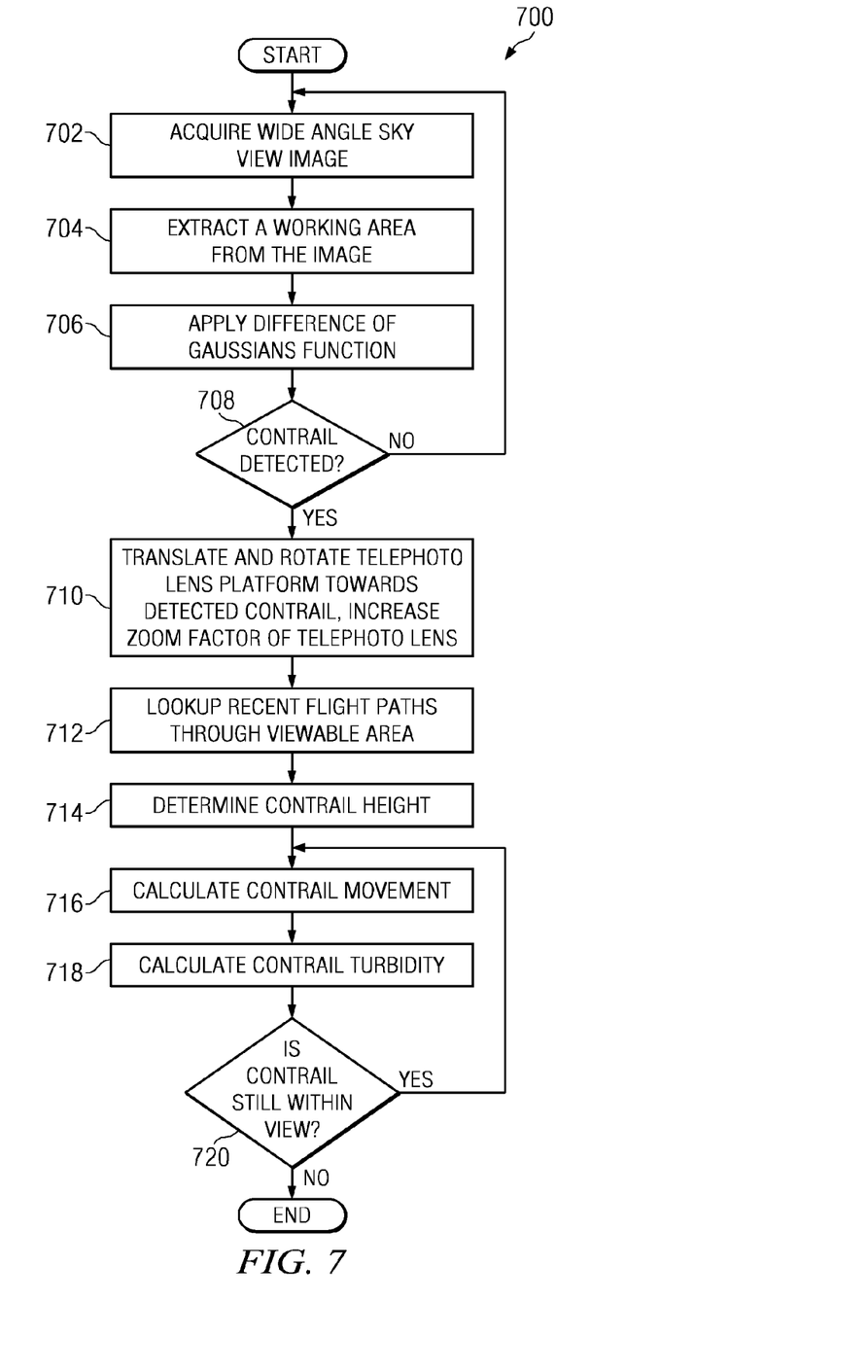
FIG. 7 is a flowchart illustrating a process for detecting and tracking a contrail in accordance with an illustrative embodiment.

FIG. 7 is a flowchart illustrating a process for detecting and tracking a contrail in accordance with an illustrative embodiment. The process in FIG. 7 is implemented by a wind monitoring system, such as wind monitoring system 300 in FIG. 3.

The process begins when a wide angle sky view image is acquired (step 702). Next, the process extracts a working area from the image (step 704). The process applies a Difference of Gaussians function (step 706) to determine whether a contrail is detected (step 708). If a contrail is not detected in step 708, the process returns to acquire another wide angle sky view image (step 702). If a contrail is detected in step 708, the process translates the information and rotates the telephoto lens platform towards the detected contrail, and increases the zoom factor of the telephoto lens (step 710). The process then looks up recent flight paths through the viewable area (step 712) and determines the contrail height (step 714). The process calculates the contrail movement (step 716) and calculates the contrails turbidity (step 718). The process determines whether the contrail is still within view (step 720). If the contrail is still within view in step 720, the process returns to step 716. If the contrail is no longer in view in step 720, the process terminates.

Thus, the illustrative embodiments provide a computer implemented method, apparatus, and computer program product for monitoring wind direction, speed, and turbidity. The visible sky is monitored by a set of cameras for contrails produced by a high-altitude aircraft. In response to identifying a contrail, the contrail is tracked across the field of view of the camera. Contrail data generated when the contrail is identified and during the tracking of the contrail is stored. The contrail data describes characteristics of the contrail including the spread of the contrail and the movement of the contrail across the field of view of the camera. Coordinates of the high-altitude aircraft are determined and compared with the contrail data to identify wind conditions.

The illustrative embodiments provide the means for a low-cost wind monitoring system that detects the speed, direction, and turbidity of the wind using consumer products. Additionally, the illustrative embodiments provide a system for determining wind conditions of a larger geographical area than current systems allow for, without the use of specialized equipment and expensive technologies.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for monitoring wind direction, speed, and turbidity, the computer implemented method comprising:

monitoring a portion of visible sky for contrails produced by a high-altitude aircraft, wherein monitoring the visible sky includes using a set of cameras, wherein the set of cameras is one or more cameras, and wherein at least one camera in the set of cameras is equipped with a hemispherical lens;

receiving a set of images of the portion of the visible sky from the set of cameras;

identifying a contrail produced by the high-altitude aircraft in at least one image of the set of images, wherein identifying the contrail comprises:

processing an image of the visible sky in the set of images;

converting the image of the visible sky to a grayscale image;

extracting an area from the grayscale image to remove effects of horizon located objects; and applying a Difference of Gaussians edge detection function to the area extracted to highlight edges of the contrail to form a pixilated image;

responsive to identifying a contrail in a hemispherical lens image, adjusting a position of the set of cameras to track movement of the contrail across the portion of the visible sky;

identifying coordinates of the high-altitude aircraft, wherein identifying coordinates of the high-altitude aircraft comprises:

requesting a list of recent flight paths associated with geospatial coordinates bounded by a field of view of the set of cameras; and receiving the list of recent flight paths, wherein the list of recent flight paths include precise coordinates for each flight path within the list of recent flight paths;

generating contrail data based on the set of images, wherein the contrail data describes characteristics of the contrail, wherein the characteristics of the contrail include spread of the contrail and movement of the contrail across the field of view of the set of cameras; and identifying wind conditions using results of a comparison of the contrail data and the coordinates of the high-altitude aircraft.

2. The computer implemented method of claim 1, wherein each pixel in the pixilated image is processed to determine if it is white or black, wherein a white pixel is background and a black pixel is contrail, and wherein an average position of each black pixel is computed and stored for a movement trend computation over time.

3. The computer implemented method of claim 1, wherein adjusting the position of the set of cameras to track movement of the contrail across the portion of the visible sky further comprises:

determining coordinates of the contrail in relation to the field of view of a camera in the set of cameras; and sending the coordinates of the contrail to a controlling program, wherein the controlling program adjusts pan, tilt, and zoom of the camera.

4. The computer implemented method of claim 3, wherein determining coordinates of the contrail in relation to the field of view of the camera further comprises:

identifying a physical location of the camera using latitude and longitude degrees;

determining settings of the camera when the contrail is identified, wherein the settings of the camera include pan and zoom; and comparing the physical location of the camera with the settings of the camera to form a bounded set of coordinates for the field of view of the camera.

5. A non-transitory computer readable storage medium storing a computer program product for monitoring wind direction, speed, and turbidity, the computer program product comprising:

computer usable program code for monitoring visible sky for contrails produced by a high-altitude aircraft, wherein monitoring the visible sky includes using a set of cameras to capture images of the visible sky, wherein the set of cameras is one or more cameras, and wherein at least one camera in the set of cameras is equipped with a hemispherical lens;

computer usable program code for receiving a set of images of the portion of the visible sky from the set of cameras;

computer usable program code for identifying a contrail produced by the high-altitude aircraft in an image, wherein identifying the contrail comprises:

computer usable program code for processing the image of the visible sky;

computer usable program code for converting the image of the visible sky to a grayscale image;

computer usable program code for extracting an area from the grayscale image to remove effects of horizon located objects; and computer usable program code for applying a Difference of Gaussians edge detection function to the area extracted to highlight edges of the contrail to form a pixilated image;

computer usable program code for adjusting a position of the set of cameras to track movement of the contrail across the portion of the visible sky, in response to identifying a contrail in a hemispherical lens image;

computer usable program code for determining coordinates of the high-altitude aircraft, comprising:

computer usable program code for requesting a list of recent flight paths associated with geospatial coordinates bounded by the field of view of the camera equipped with the hemispherical lens; and computer usable program code for receiving the list of recent flight paths, wherein the list of recent flight paths include precise coordinates for each flight path within the list of recent flight paths;

computer usable program code for storing contrail data generated while identifying and tracking the contrail, wherein the contrail data describes characteristics of the contrail, wherein the characteristics of the contrail include spread of the contrail and movement of the contrail across the field of view of the camera; and computer usable program code for comparing the contrail data and the coordinates of the high-altitude aircraft to determine wind conditions.

6. The non-transitory computer readable storage medium of claim 5, wherein each pixel in the pixilated image is processed to determine if it is white or black, wherein a white pixel is background and a black pixel is contrail, and wherein an average position of each black pixel is computed and stored for a movement trend computation over time.

7. The non-transitory computer readable storage medium of claim 5, wherein tracking the contrail further comprises:

computer usable program code for determining coordinates of the contrail in relation to the field of view of the camera; and computer usable program code for sending the coordinates of the contrail to a controlling program, wherein the controlling program adjusts pan, tilt, and zoom of the camera.

8. The non-transitory computer readable storage medium of claim 7, wherein determining coordinates of the contrail in relation to the field of view of the camera further comprises:

computer usable program code for identifying a physical location of the camera using latitude and longitude degrees;

computer usable program code for determining settings of the camera when the contrail is identified, wherein the settings of the camera include pan and zoom; and computer usable program code for comparing the physical location of the camera with the settings of the camera to form a bounded set of coordinates for the field of view of the camera.

9. An apparatus for monitoring wind direction, speed, and turbidity, the apparatus comprising:

a camera;
a hemispherical lens;
a telephoto lens;
a movable platform; and a data processing system, wherein the data processing system executes instructions to monitor a portion of visible sky for contrails produced by a high-altitude aircraft, wherein monitoring the visible sky includes using a set of cameras, wherein the set of cameras is one or more cameras, and wherein at least one camera in the set of cameras is equipped with a hemispherical lens, to capture images of the visible sky; receive a set of images of the portion of the visible sky from a set of cameras, identify a contrail produced by the high-altitude aircraft in at least one image of the set of images, wherein instructions to identify the contrail comprise instructions to process an image of the visible sky in the set of images, instructions to convert the image of the visible sky to a grayscale image, instructions to extract an area from the grayscale image to remove effects of horizon located objects, and instructions to apply a Difference of Gaussians edge detection function to the area extracted to highlight edges of the contrail to form a pixilated image, wherein each pixel in the pixilated image is processed to determine if it is white or black, wherein a white pixel is background and a black pixel is contrail, and wherein an average position of each black pixel is computed and stored for a movement trend computation over time; adjust a position of the set of cameras to track movement of the contrail across the portion of the visible sky, in response to identifying a contrail in a hemispherical lens image; generate contrail data based on the set of images, wherein the contrail data describes characteristics of the contrail, wherein the characteristics of the contrail include spread of the contrail and movement of the contrail across a field of view of the set of cameras; identify coordinates of the high-altitude aircraft, wherein identifying coordinates of the high-altitude aircraft comprises requesting a list of recent flight paths associated with geospatial coordinates bounded by the field of view of the camera, and receiving the list of recent flight paths, wherein the list of recent flight paths include precise coordinates for each flight path within the list of recent flight paths; and identify wind conditions using results of a comparison of the contrail data and the coordinates of the high-altitude aircraft.

10. The apparatus of claim 9, wherein the data processing system further executes the instructions to adjust the position of the set of cameras to track the movement of the contrail across the portion of the visible sky comprise further instructions to determine coordinates of the contrail in relation to the field of view of a camera in the set of cameras; and send the coordinates of the contrail to a controlling program, wherein the controlling program adjusts pan, tilt, and zoom of the camera.

11. The apparatus of claim 10, wherein the data processing system further executes the instructions to determine coordinates of the contrail in relation to the field of view of the camera comprise further instructions to identify a physical location of the camera using latitude and longitude degrees; determine settings of the camera when the contrail is identified, wherein the settings of the camera include pan and zoom; and compare the physical location of the camera with the settings of the camera to form a bounded set of coordinates for the field of view of the camera.

* * * * *